(12) United States Patent
Davidson (10) Patent No.: US 11,849,734 B1
(45) Date of Patent: Dec. 26, 2023

(54) CRAB SHELL CUTTER

(71) Applicant: Rail Holdings, LLC, Mahwah, NJ (US)

(72) Inventor: Casey Davidson, Charleston, SC (US)

(73) Assignee: Rail Holdings, LLC, Mahwah, NJ (US)

( * ) Notice: Subject to any disclaimer, the term of this patent is extended or adjusted under 35 U.S.C. 154(b) by 478 days.

(21) Appl. No.: 16/700,702

(22) Filed: Dec. 2, 2019

Related U.S. Application Data (60) Provisional application No. 62/774,690, filed on Dec. 3, 2018.

(51) Int. Cl.
| | |
|---|---|
| *A22C 29/00* | (2006.01) |
| *A47G 21/06* | (2006.01) |
| *A22C 29/02* | (2006.01) |
| *B26B 13/08* | (2006.01) |
| *A47J 43/26* | (2006.01) |

(52) U.S. Cl.
CPC ............ *A22C 29/027* (2013.01); *A47G 21/06* (2013.01); *A47J 43/26* (2013.01); *B26B 13/08* (2013.01)

(58) Field of Classification Search
CPC ......... B26B 13/06; B26B 13/08; B26B 13/10; B26B 13/12; B26B 13/16; B26B 13/18; B26B 13/22; A47J 43/26; A22C 29/024; A22C 29/027; A47G 21/06; A47G 21/061; A47G 21/065
USPC ..... 30/120.1, 262; 452/6; D7/693, 695, 696; D8/52, 54–58
See application file for complete search history.

(56) References Cited

U.S. PATENT DOCUMENTS

| | | | | |
|---|---|---|---|---|
| 1,219,857 | A | * | 3/1917 | Parkhurst ............. A47G 21/061 452/6 |
| 2,596,382 | A | * | 5/1952 | Duke ...................... A47J 43/26 30/120.3 |
| 3,395,421 | A | | 8/1968 | Harless, Jr. |
| 3,685,097 | A | * | 8/1972 | Scott .................... A47G 21/065 30/120.4 |
| 3,808,617 | A | * | 5/1974 | Lindsten .................. B25B 7/22 7/152 |
| 3,846,908 | A | | 11/1974 | Allievi |
| 3,869,793 | A | * | 3/1975 | Ferguson .................. B25B 7/14 30/262 |
| 4,114,268 | A | * | 9/1978 | Hildebrandt ............ B26B 13/16 30/262 |

(Continued)

FOREIGN PATENT DOCUMENTS

| | | | | |
|---|---|---|---|---|
| CA | 2443152 | A1 * | 3/2005 | ............ A22C 29/024 |
| DE | 4000927 | A1 * | 1/1991 | .............. B26B 13/08 |
| DE | 202012008980 | U1 * | 3/2013 | ............ A22C 29/027 |

OTHER PUBLICATIONS

Amazon Prepworks by Progressive Seafood Scissors, URL: https://www.amazon.com/Prepworks-by-Progressive-Seafood-Scissors/dp/B00MIN7HSK, Aug. 21, 2018, Web.

(Continued)

*Primary Examiner* — Jason Daniel Prone
(74) *Attorney, Agent, or Firm* — Dinsmore & Shohl LLP (57) ABSTRACT

A crab shell cutter is provided which has first and second handles and first and second jaws which pivot relative to one another. The jaws include a tapered jaw line which comprises having a tapered surface from which a plurality of serrations extend. The serrations are pyramidal in shape. When engaging a crab shell, the plurality of serrations form linear perforations in the shell but inhibit damage of the underlying crab meat.

14 Claims, 5 Drawing Sheets

(56) References Cited

U.S. PATENT DOCUMENTS

| | | | |
|---|---|---|---|
| 4,182,151 A * | 1/1980 | Pedersen | B44D 3/12 |
| | | | 30/446 |
| 4,463,495 A * | 8/1984 | Johnson | A47G 21/06 |
| | | | 30/142 |
| 4,607,544 A | 8/1986 | Jewell, Jr. | |
| 4,658,456 A * | 4/1987 | Tsai | B26B 13/22 |
| | | | 7/151 |
| 4,716,627 A | 1/1988 | Scott, Jr. | |
| 4,729,150 A | 3/1988 | Breaux et al. | |
| 5,063,671 A * | 11/1991 | Huang | B26B 13/16 |
| | | | 30/262 |
| 5,463,814 A * | 11/1995 | Stowell | B26B 13/12 |
| | | | 30/232 |
| 5,774,991 A * | 7/1998 | Shi | B26B 13/16 |
| | | | 30/262 |
| 6,023,805 A | 2/2000 | Lin | |
| 6,129,622 A * | 10/2000 | Seaman | A22C 29/024 |
| | | | 452/6 |
| 6,195,898 B1 * | 3/2001 | Lemisch | B26B 3/06 |
| | | | 30/262 |
| 6,202,517 B1 | 3/2001 | Dolan | |
| 6,226,822 B1 | 5/2001 | Chen | |
| 6,301,787 B2 * | 10/2001 | Mock | B26B 13/16 |
| | | | 30/262 |
| 6,336,272 B1 * | 1/2002 | Lee | B26B 13/16 |
| | | | 30/262 |
| 6,446,344 B1 * | 9/2002 | Gontar | B26B 13/16 |
| | | | 30/262 |
| D469,323 S * | 1/2003 | Linden | D8/5 |
| 6,578,221 B2 | 6/2003 | Ping | |
| 6,817,937 B1 | 11/2004 | Merritt | |
| D528,378 S | 9/2006 | LeBoeuf, Jr. | |
| 7,112,129 B2 * | 9/2006 | Zimbone | A22C 29/024 |
| | | | 452/6 |
| 7,169,033 B1 | 1/2007 | Colbert | |
| D536,586 S | 2/2007 | Macor | |
| D537,311 S * | 2/2007 | Peterson | D8/57 |
| 7,198,562 B2 * | 4/2007 | Whetstone | A22B 5/0023 |
| | | | 452/6 |
| 7,261,627 B2 * | 8/2007 | Sellars, Jr. | A22C 29/024 |
| | | | 452/103 |
| 7,361,080 B2 | 4/2008 | Martin | |
| 7,481,700 B1 * | 1/2009 | Leboeuf, Jr. | A22C 29/024 |
| | | | 452/6 |
| 7,621,803 B2 * | 11/2009 | Martin | A47G 21/061 |
| | | | 452/6 |
| D623,917 S * | 9/2010 | Goetz | D8/57 |
| D635,427 S | 4/2011 | Chervenak | |
| 8,832,945 B2 * | 9/2014 | Yang | B26B 13/16 |
| | | | 30/262 |
| D775,504 S | 1/2017 | Dechant | |
| D787,901 S * | 5/2017 | McNeal | D7/693 |
| 9,949,496 B2 | 4/2018 | Anderson, Jr. | |
| D900,563 S | 11/2020 | Davidson | |
| D916,567 S * | 4/2021 | Davidson | D7/693 |
| 2004/0187662 A1* | 9/2004 | Ulmer | B26F 1/24 |
| | | | 30/355 |
| 2005/0159092 A1* | 7/2005 | Stanislaw | A22C 29/024 |
| | | | 452/6 |
| 2005/0223565 A1* | 10/2005 | Rutovic | B26B 13/10 |
| | | | 30/230 |
| 2010/0273406 A1* | 10/2010 | von Schoultz | A22C 29/024 |
| | | | 452/6 |
| 2013/0260658 A1* | 10/2013 | Brooks | A22C 29/027 |
| | | | 452/6 |
| 2015/0128427 A1* | 5/2015 | Linn | B26B 13/06 |
| | | | 30/260 |

OTHER PUBLICATIONS

Overstock Kitchen Lobster Crab Claws Stainless Steel Nut Cracker Walnut Pliers Opener, URL: https://www.overstock.com/Home-Garden/Kitchen-Lobster-Crab-Claws-Stainless-Steel-Nut-Cracker-Walnut-Pliers-Opener/18424852/product.html, Aug. 21, 2018, Web.
Provisional U.S. Appl. No. 62/774,690 entitled "Crab Shell Cutter" filed Dec. 3, 2018.
Design U.S. Appl. No. 29/672,142 entitled "Crab Shell Cutter" filed Dec. 3, 2018.

* cited by examiner

CRAB SHELL CUTTER

CLAIM TO PRIORITY

This non-provisional patent application claims priority to and benefit of, under 35 U.S.C. § 119(e), U.S. Provisional Patent Application Ser. No. 62/774,690, filed Dec. 3, 2018, and titled "Crab Shell Cutter", all of which is incorporated by reference herein.

CROSS REFERENCE TO RELATED APPLICATIONS

Cross-reference is made to U.S. Design Pat. application No. 29/672,142, titled "Crab Shell Cutter", filed Dec. 3, 2018, all of which is incorporated by reference herein.

BACKGROUND

1. Field of the Invention

Present embodiments relate to a crab shell cutter. More specifically, present embodiments relate to a crab shell cutter which creates a generally linear plurality of perforations or punctures in the crab shell for cutting of the shell and easier removal of large clumps of meat in an undamaged manner.

2. Description of the Related Art

It is desirable to serve and eat crab meat in the most efficient manner by providing the largest clumps of meat to the consumer or the meal preparer. Unfortunately, various known devices for cracking crab shells do so in a manner which breaks the crab meat clumps resulting in the removal of smaller pieces of meat. For example, many "nut-cracker" or scissor-style crab shell crackers apply pressure along a continuous surface. Ultimately pressure is applied until the shell cracks, but often this is in an uncontrolled manner. As a result, often times, large pieces of meat are broken up into numerous smaller pieces which are less desirable to eat and less appealing to both the end consumer and the meal preparer.

It would be desirable to provide a device which allows for more efficient removal of larger pieces of crab meat from the shell. Further, it would also be desirable to provide a device which does so with improved comfort and less likelihood of injury to the person cutting the shell.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments relate to a crab shell cutter which cuts the crab shells in a manner which limits the damage to the crab meat immediately beneath the shell. The cutter provides a linear arrangement of a plurality of perforations in the shell that make removal of the shell clean without damaging the underlying crab meat. Accordingly, the crab meat may more easily be removed from the shell as well. The present functionality may be provided by the cutter having handles which are pivotally connected and each include operable jaws to perforate the shell. The jaws have teeth which are defined by serrations which are spaced apart between the upper and lower jaws and further are spring biased to help control depth of cut. Thus, when the jaws are fully closed, the upper teeth are spaced from the lower teeth limiting the damage to the crab meat upon cutting of the shell.

According to some embodiments, a crab shell cutter may comprise a first handle connected to a first jaw, a second handle connected to a second jaw, wherein the handles are capable of being manipulated to one of an open or close the first and second jaws, a pivot connection operably connecting the first handle and second handle at a position between the handle and the jaws, each of the jaws having a tapered inner jaw line which tapers from a thicker jaw dimension, to a thinner dimension, a plurality of serrations at the thinner dimension of the inner jaw line, the serrations forming a curvilinear opening shape along serration tips when the jaws are closed.

Optional embodiments may also be utilized with the crab shell cutter either alone or in combination with other optional embodiments. For non-limiting example, the serration tips of the first jaw are horizontally offset from the serration tips of the second jaw. The crab shell cutter may further comprise a bottle opener extending from one of the handles. The crab shell cutter may further comprise a spring to bias the jaws to an open position. The spring may be disposed in a housing. The housing may be a first and second housing which together define an internal seat for the spring. The crab shell cutter may further comprise a lock. One of the handles may comprise ergonomic scallops. The other of the handles may further comprise a finger guard. The serrations may be pyramidal and may extend from the tapered inner jaw lines. The pyramidal serrations may be formed integrally with the jaw line. The pyramidal serrations capable of puncturing a crab shell and creating a line of punctures to break the crab shell on opposite sides.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a crab shell cutter will now be described by way of examples. These embodiments are not to limit the scope of the claims as other embodiments of a crab shell cutter will become apparent to one having ordinary skill in the art upon reading the instant description. Non-limiting examples of the present embodiments are shown in figures wherein:

DETAILED DESCRIPTION

It is to be understood that a crab shell cutter is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-5, a crab shell cutter is depicted which is utilized to cut crab shells while limiting or inhibiting damage to the underlying meat. As a result, the crab shells may be perforated and cut, and the crab meat removed in larger chunks which is more appetizing and more desirable for both the end consumer and the food preparer. The present embodiments provide a plurality of perforations which create a linear break line along the crab shell. The shell may then be broken apart along the perforation with less damage to the meat. The device also provides ergonomic improvements to handles which improve the user's ability to cut the shell and is also spring loaded both features providing some level of protection against injury to the user when cutting is especially difficult or thicker crab shells.

Figure 1:
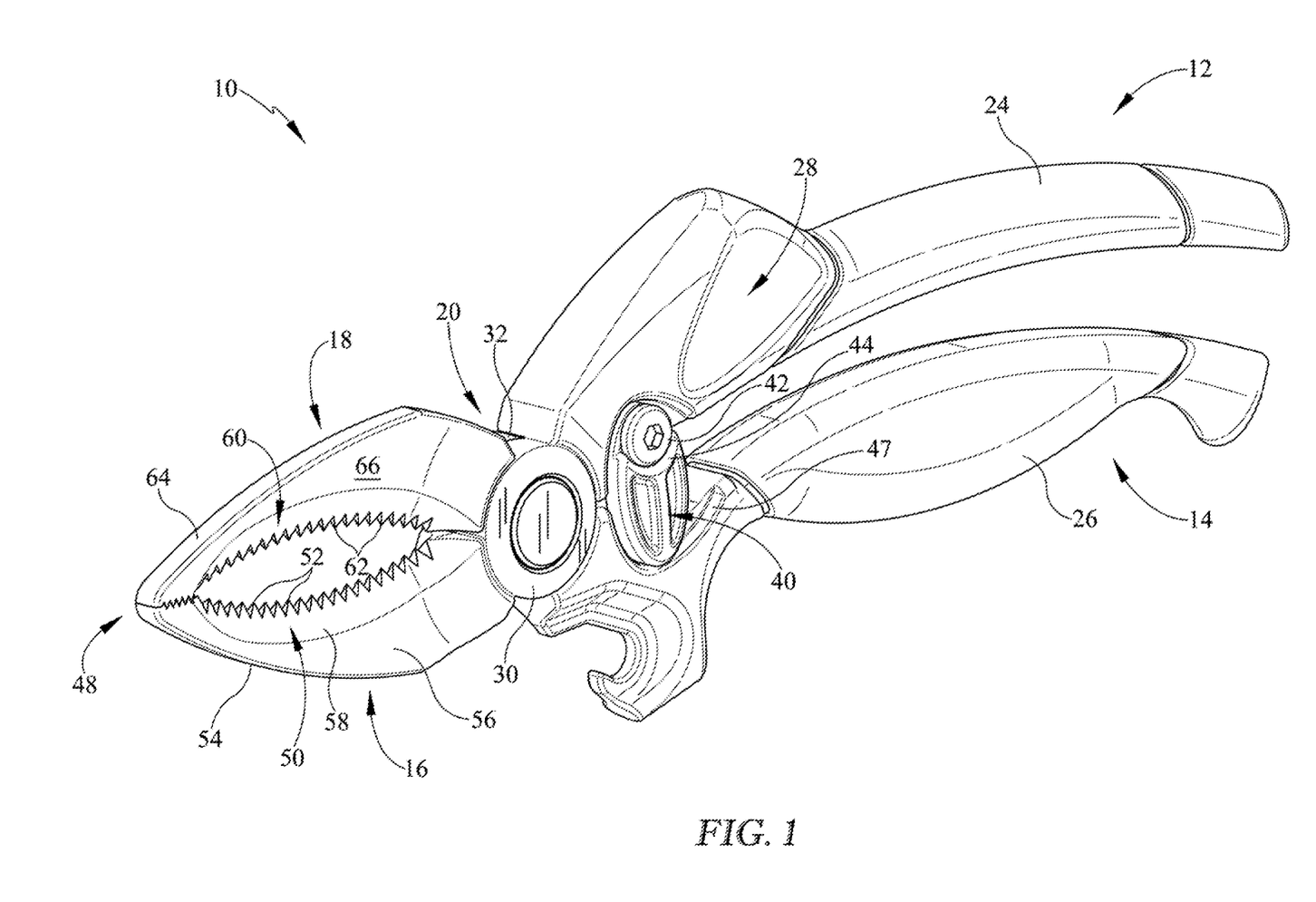
FIG. 1 is a first perspective view of the crab shell cutter.

Referring now to FIG. 1, a crab shell cutter 10 is depicted in perspective view. The crab shell cutter 10 comprises a first handle 12 and a second handle 14, which are pivotally connected to open or close first and second jaws 16, 18. The first and second handles 12, 14 are operably connected at a pivot connection 20. In some embodiments, the first handle 12 is connected to the first jaw 16 and the second handle 14 is connected to the second jaw 18. When the handles 12, 14 are moved from the closed position depicted, the first and second jaws 16, 18 open away from each other in order to provide a space in which a crab shell may be positioned for cutting or puncturing. The handles 12, 14 may be formed integrally with the jaws 16, 18 or may be formed in two or more pieces. Each handle 12, 14 may include an engagement surface 24, 26 which engages the user's hand. The handles 12, 14 may each be defined by a plurality of surfaces as well in order to improve ergonomics. In some embodiments, the engagement surface 24 is an upper surface which engages the palm of the user's hand and the second handle 14 includes an engagement surface 26 which the user's fingers may grip in order to close the jaws 16, 18. The surfaces 24, 26 may each be one or more surfaces. Further, the engagement surfaces 24, 26 may be formed of the same material as the remainder of the handles 12, 14 or may be formed of different materials, for example a material such as a softer rubber or plastic material which enhances gripping of this portion of the tool 10.

In the depicted embodiment, the handles 12, 14 are shown in a closed position. The handles 12, 14 may be entirely together or may have a spaced apart gap, as shown. The first handle 12 may also comprise an ergonomic scalloped area 28. The ergonomic scalloped area 28 allows for positioning of the thumb during use of the crab shell cutter 10. The scalloped area 28 may be located on either side so that the cutter 10 may be used with either hand.

Each of the handles 12, 14 is connected by a spring housing 30 to one of the jaws 16, 18. In the instant embodiment, the handle 12 is connected to the first jaw 16 by the first housing 30. The second handle 14 is connected to the second jaw 18 by a second housing 32. The two housings 30, 32 pivot about a fastener 33 (FIG. 2), which comprise the pivot connection 20. The housings 30, 32 may also house a spring as will be discussed further herein to bias the jaws toward a position.

Also shown generally between the handles 12, 14 is a lock 40. In some embodiments, the lock 40 is pivotally connected to one, or both, of the handles 12, 14 and engages the other of the handles 12, 14 to maintain the jaws 16, 18 in the closed position. The instant lock 40 comprises a fastener 42 connected to the first handle 12 and wherein a switch 44 pivots about the fastener 42 in order to engage or disengage the second handle 14. In some embodiments, one or two fasteners may be used for switches 44 on both sides of the cutter 10.

Moving forward of the pivot connection 20, the jaws 16, 18 are shown. Each of the first and second jaws 16, 18 is connected to one of the housings 30, 32. Thus, with movement of each handle 12, 14, one of the jaws 16, 18 will move. Variations of this may be provided wherein only one of the jaws 16, 18 is moveable relative to the other, such as an embodiment wherein one of the jaws 16, 18 is continually fixed and the other one is moveable.

In the instant embodiment, the first jaw 16 includes a tapered jaw line 50 which tapers from a wider jaw width to a more narrow dimension having a plurality of serrations 52, which define teeth. The jaw 16 has a lower most surface 54 and side surfaces 56. In the instant embodiment, the jaw 16 is widest at the lower most edge near surface 54 and the surfaces 56 extend vertically therefrom. Above the vertical surface 56, the jaw line 50 tapers at surface 58. The tapered surface 58 extends into the serrations 52. Otherwise stated, the tapered jaw line 50 is formed by the tapering surface 58 which turns into the serrations 52.

Also shown in the embodiment, the serrations 52 are pyramidal in shape and define a plurality of teeth along the tapered jaw line 50. The points of the serrations 52 are generally linearly arranged from a nose end 48 toward the pivoting connection 20. The second jaw 18 is of a similar construction wherein the jaw 18 is wider at the surface 64 and tapers after the vertical surface 66 at tapered jaw line 60 to a plurality of serrations 62. These serrations 62 are also linear from tip to tip as are the lower jaw 16, extending from the nose end 48 toward the pivot connection 20. The tapered jaw line is merely a location and may or may not be a physical line on the jaw where the taper begins. Thus no undue limitation of the area should be made due to the use of the term "line".

The serrations 52, 62 are pointed toward one another between first and second jaws 16, 18. The serrations 52, 62 may be aligned vertically or may be offset horizontally from each other. As shown in the closed position, the serrations 62 are spaced from the serrations 52. In this spaced area, the crab shell may be positioned where the jaws 16, 18 are opened. When the jaws 16, 18 are closed, the spacing apart of the jaws 16, 18 and serrations 52, 62, along with the spring biasing limits breakage of meat. Further however, the nose end 48 of the jaws 16, 18 may be touching to provide ease for grasping a crab leg or claw, or may be narrow to additionally allow picking of meat within the shell.

In operation, the jaws 16, 18 are opened by way of the handles 12, 14 so that a crab shell may be positioned between the serrations 52, 62. As the handles 12, 14 are pressed together, the serrations 52, 62 begin cutting the crab shell and forming linear perforations along the shell which result in a line of perforations on the crab shell corresponding to the serrations 52, 62 of the jaws 16, 18. These serrations 52, 62 create a breakage line for the crab shell and once pierced, the shell may be broken easily while limiting further damage to the crab meat beyond the initial perforations or punctures of the crab shell.

Figure 2:
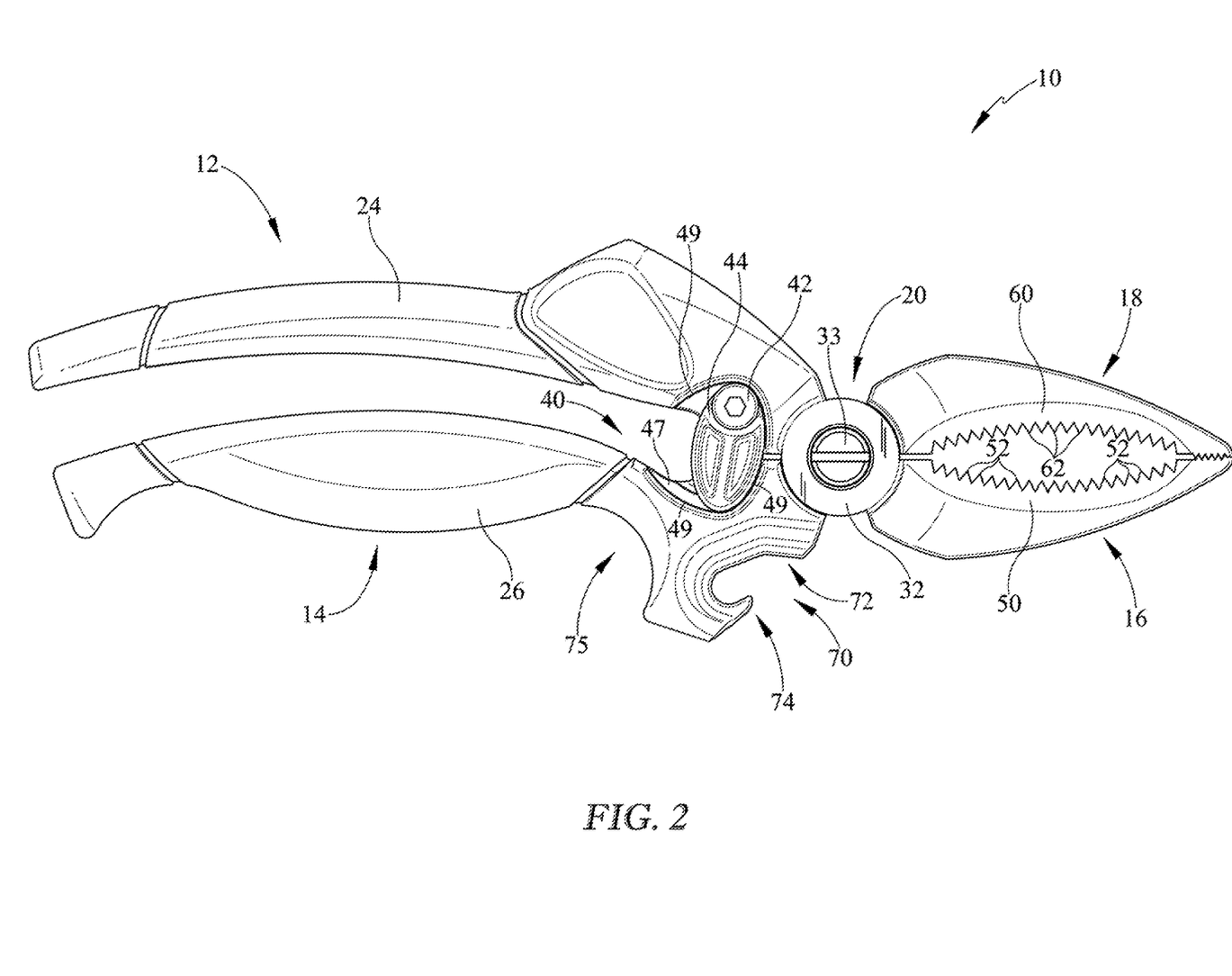
FIG. 2 is a side view of the crab shell cutter depicted from a side opposite FIG. 1.

Referring now to FIG. 2, a side view of the crab shell cutter 10 is shown from the opposite side of that shown in FIG. 1. The first and second handles 12, 14 are shown and may be formed in various manners. The handles 12, 14 may be formed of a single piece of material such as, for non-limiting example, metal or hard molded plastic which has requisite strength for performing the crab shell cutting. Alternatively, the handles 12, 14 may be formed of an internal metal or other hard material and may be covered by a hard plastic material and/or rubber material which is disposed over the metal to provide a more ergonomic and aesthetically pleasing function and appearance. The first handle 12 is shown as being a smaller size as the first handle 12 may engage the user's palm when in use. The second handle 14 is a larger size to allow the user's fingers to curl around the at least one surface 26.

Positioned forward of the second handle 14 is a bottle opener 70. The bottle opener 70 includes a fulcrum 72 and a tooth 74 which engages beneath a bottle cap. The fulcrum 72 is positioned on the opposite upper side of the cap from the tooth 74 and with a lifting force on the second handle 14. The bottle cap may be lifted and/or removed from the bottle. The bottle opener 70 is positioned forward of a finger guard 75. The position of the finger guard 75 also allows for better control of the crab shell cutter 10 as the fingers may be positioned against the guard for improved stability of the cutter 10 closer to the jaws 16, 18. Likewise, the finger guard 75 also protects from some scraping by crab shells.

Further however, the handle 14 may also comprise alternate or additional structures. For example, the handle 14 may comprise a blade on an inner surface of the tooth 74, inside the opening depicted, for linear tearing of long crab legs. This could be accomplished by pivoting against the fulcrum and cutting with the blade while moving along the crab leg.

Also in this view, the opposite side of the pivot connection 20 is depicted. The housing 32 is shown in this view with a fastener 33 extending therethrough. With brief additional reference to FIG. 1, a cap, nut, or other structure may be used on the other side to either connect the fastener 33 to the housings 30, 32 or to merely hide the opposite end of the fastener 33 from being seen. Further, in this view, the lock 40 and switch 44 are depicted. The switch 44 pivots about the fastener 42 previously described and in this view, the shape of the upper and lower handle areas may be clearly seen which allows the opening or locking closed of the first and second handles 12, 14. The perimeter of the handles 12, 14 adjacent to the lock switch 44 are formed of a plurality of curvilinear lines 49 which allow for pivoting motion of the lock switch 44 about the fastener 42.

Figure 3:
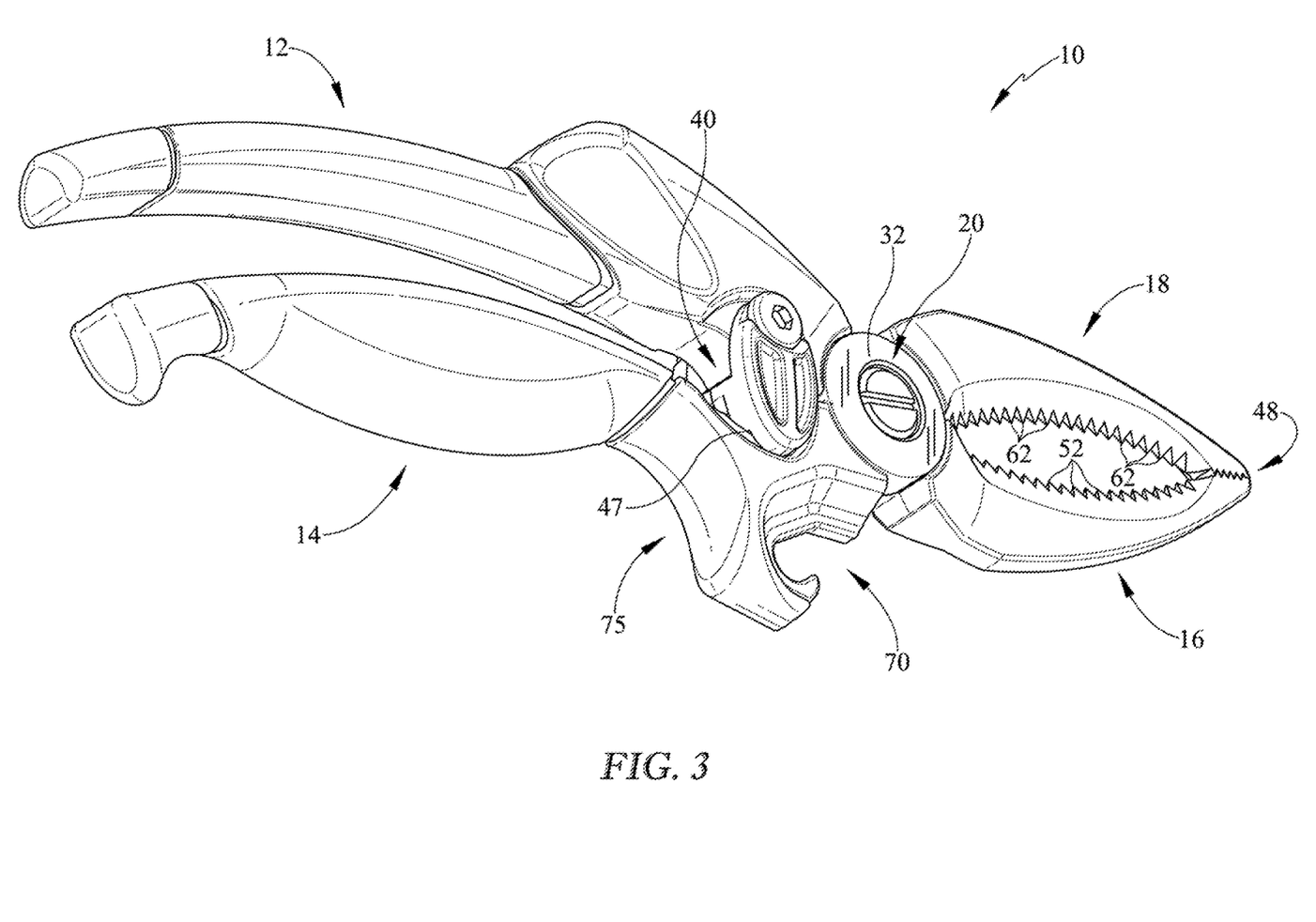
FIG. 3 is a lower perspective view of the crab shell cutter.

Referring now to FIG. 3, a lower perspective view of the side of the crab shell cutter 10 shown in FIG. 2 is depicted. A surface of the finger guard 75 is shown opposite the bottle opener 70, on the lower side of the cutter 10.

The handles 12, 14 are shown in a closed and locked position by the lock 40 and as a result, the first and second jaws 16, 18 are also shown in the closed position. As in the previous views, the serrations 52 of the first jaw 16 are spaced apart from the serrations 62 of the second jaw 18. The serrations 52, 62 for each jaw 16, 18 are arranged in linear fashion from tip to tip and are also curved from nose 48 to connection 20 so that the serrations 52, 62 do not engage one another but instead provide a space when the jaws 16, 18 are closed. The spacing formed between the serrations 52, 62 allows puncture of the crab shell with limited, if any, damage to the crab meat within the shell. The serrations 52, 62 increase in width, with increasing depth into the shell. This causes increased size of the perforations forming the linear cutting line. The serrations 52, 62 cause the puncturing in linear arrangement which creates the cutting line of the shell. The shell may then be more easily cracked with minimal damage to the crab meat.

As shown by comparing FIG. 1 with FIGS. 2 and 3, the lock 40 may have the switch 44 located on either side of the handle 12, 14, or both. When the switch is positioned at both sides of the cutter 10, this allows for easier ambidextrous use for right handed and left handed users to unlock the cutter 10. The switch 44 may further comprise a guide which engages a finger 46 (FIG. 4) which engages a track 47 to maintain the jaws 16, 18 as related to handles 12, 14 in the closed position.

Figure 4:
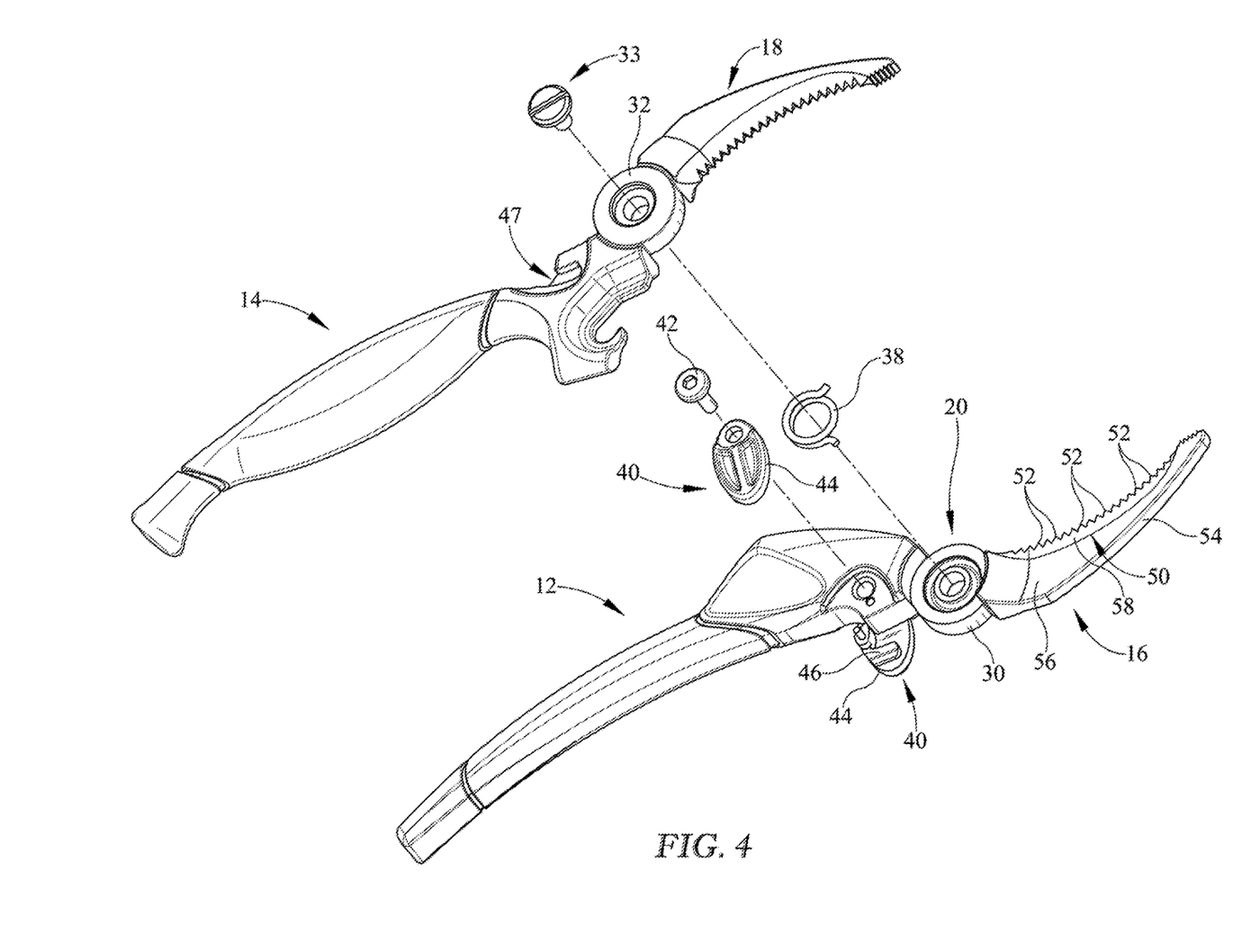
FIG. 4 is an exploded perspective view of the crab shell cutter.

Referring now to FIG. 4, the crab shell cutter 10 is shown in exploded perspective view. The first handle 12 and first jaw 16 are shown separated from the second handle 14 and the second jaw 18. In this view, the lower surface 54 of the jaw 16 is shown and the side surface 56. The surface 56 extends upwardly from the lower surface 54 to the tapered jaw line 50, where surface 58 begins tapering inwardly to the points of the serrations 52. The serrations 52 extend from the tapered surface 58 and are formed of pyramidal shape. The serrations 52 therefore create points of perforations for the crab shell cutter 10. The jaw 16 may therefore be formed of a single piece of material such that the jaw 16 and the tapered jaw line 50 and serrations 52 are all substantially unitary when formed.

Also shown in this view, the housing 30 is depicted from an interior side of the pivot connection 20. Each of the housings 30, 32 may include a channel or other structure to retain a torsion spring 38 therein. The spring 38 engages each of the housings 30, 32 and is hidden by the housings 30, 32 within the pivot connection 20. In other embodiments, the spring 38 may be formed to engage either of the handles 12, 14 and/or either of the jaws 16, 18. In any event, the torsion spring 38 biases or causes the jaws 16, 18 toward an open position. Accordingly, the handles 12, 14 and jaws 16, 18 may be closed and locked with the lock 40.

Additionally, the switch 44 locking function is shown. The switch 44 pivots so that finger 46 engages the track 47. When the switch 44 is pivoted about the fastener 42, the finger 46 is positioned within the track 47 retaining the handles 12, 14 and jaws 16, 18 in the locked, closed position. The first and second handles 12, 14 are pivotally connected and the switch 44 and fastener 42 are connected to one of the handles. The track 47 is on the other of the handles so that the switch 44 may be pivoted to engage or disengage the track 47.

Figure 5:
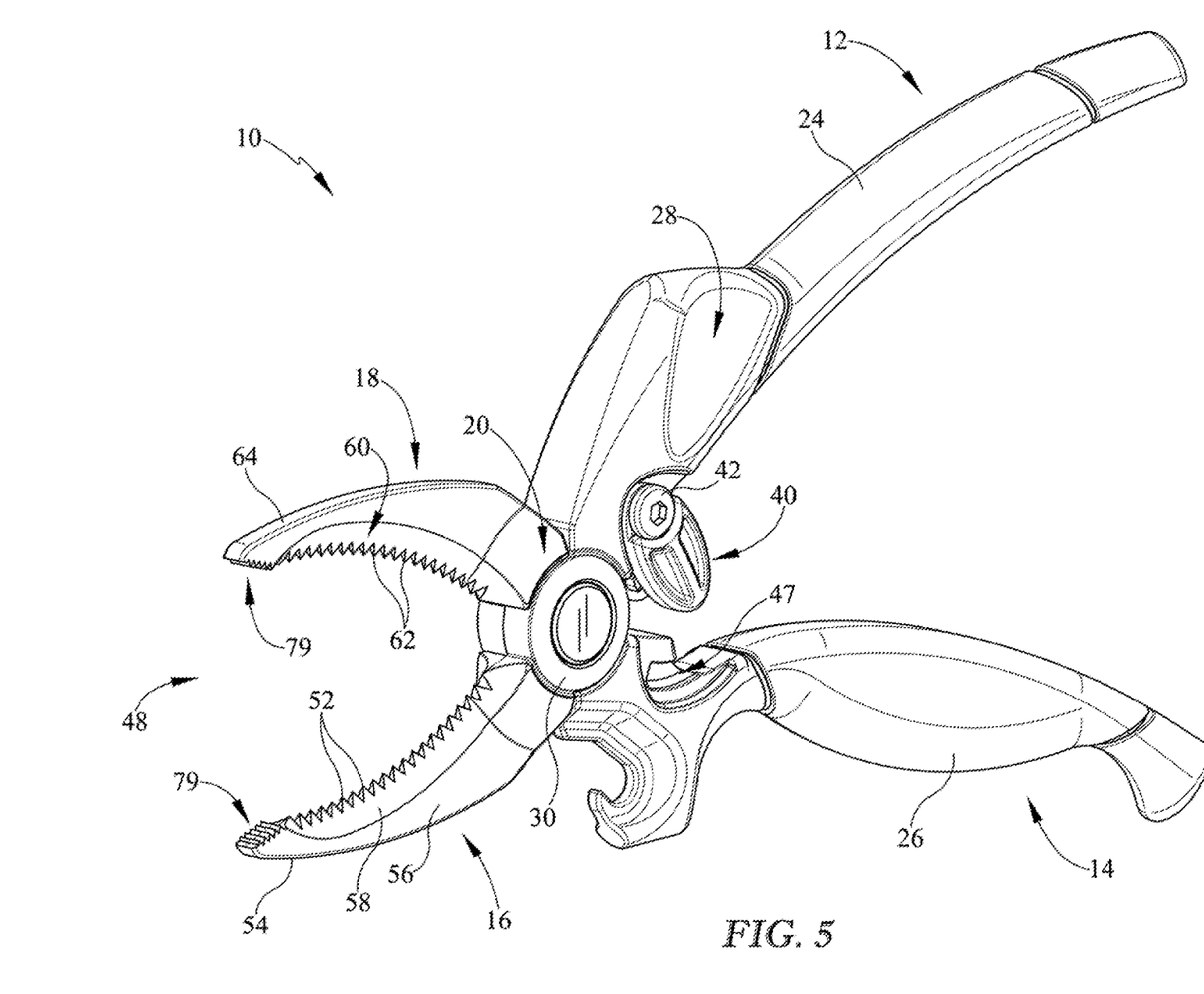
FIG. 5 is a perspective view of the crab shell cutter shown in an open position.

Referring now to FIG. 5, a perspective view of the crab shell cutter 10 is depicted in an alternate configuration wherein the lock 40 is disengaged and the handles 12, 14 and jaws 16, 18 are in an open orientation. At the nose end 48 of the cutter 10 are a plurality of serrations 79 which extend linearly across the width of the jaws. These serrations 79 engage one another when the jaws 16, 18 are in the closed position, but the remaining serrations 52, 62 extending toward the pivot connection 20 do not otherwise engage one another when the handles and jaws are closed.

From the depicted position, a crab shell may be placed between the serrations 52, 62 and the handles 12, 14 then closed. As the serrations 52, 62 engage the crab shell, perforations are formed within the crab shell in a linear pattern. Once the perforations are formed, the handles 12, 14 may be slightly released and the crab shell rotated to apply additional perforations or the first perforations may be used to break the shell open and access the meat therein. In either event, ultimately as the perforations are formed and the shell may be easily broken apart, the meat is left inside generally undamaged so that larger clumps of crab meat may be removed from the shell once the shell is opened. Once the cutter 10 is done being used, the handles 12, 14 may be closed and the switch 44 rotated so that the track 47 is engaged by the finger 46 (FIG. 4).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A crab shell cutter, comprising:
   a first handle connected to a first jaw, the first handle having a first grip portion and a bulbous member that is wider than the first grip portion, the bulbous member having at least one ergonomic scallop allowing for positioning of a user's thumb;
   a second handle connected to a second jaw, the second handle having a second grip portion and a forward member, the forward member having a bottle opener;
   a pivot connection operably connecting the bulbous member and the forward member at a position between the respective handles and the jaws so that the handles are capable of being manipulated to open and close the first and second jaws;
   each of said first and second jaws having a tapered inner jaw line which tapers from a thicker jaw dimension, to a thinner dimension;
   a plurality of serrations at each of said thinner dimension of each of said tapered inner jaw lines, said plurality of serrations forming a curvilinear opening shape along tips of said plurality of serrations when said first and second jaws are closed.

2. The crab shell cutter of claim 1, wherein said plurality of serrations of the first jaw are horizontally offset from said plurality of serrations of the second jaw.

3. The crab shell cutter of claim 1 further comprising a spring to bias said first and second jaws to an open position.

4. The crab shell cutter of claim 3, said spring being disposed in a housing.

5. The crab shell cutter of claim 4, said housing being a first housing part and a second housing part which together define an internal seat for said spring.

6. The crab shell cutter of claim 3 further comprising a lock.

7. The crab shell cutter of claim 1 wherein the at least one ergonomic scallop is two scallops.

8. The crab shell cutter of claim 7, the second handle further comprising a finger guard.

9. The crab shell cutter of claim 1, wherein said plurality of serrations are pyramidal.

10. The crab shell cutter of claim 9, wherein said pyramidal serrations extend from said tapered inner jaw line of each of said first and second jaws.

11. The crab shell cutter of claim 10, wherein said pyramidal serrations are formed integrally with said tapered inner jaw line of each said first and second jaws.

12. The crab shell cutter of claim 9, said pyramidal serrations configured to puncture a crab shell and creating a line of punctures to break said crab shell on opposite sides.

13. A crab shell cutter, comprising:
   a first handle connected to a first jaw, said first handle having a first grip portion;
   a second handle connected to a second jaw, said second handle having a second grip portion and a forward member having a bottle opener;
   a pivot connection operably connecting said first handle and said second handle at a position between the handles and the jaws, wherein said first and second handles are capable of being manipulated to move the first and second jaws between an opened position and a closed position;
   an ergonomic scalloped area formed in a bulbous member, said bulbous member disposed between said first handle and said pivot connection, said ergonomic scalloped area allowing for positioning of a thumb;
   each of said first and second jaws having a tapered inner jaw line which tapers from a thicker jaw dimension, to a thinner dimension;
   a plurality of serrations at each of said thinner dimension of each of said tapered inner jaw line, said plurality of serrations forming a curvilinear opening shape along tips of said plurality of serrations when said first and second jaws are closed;
   a pivoting switch with a finger on said first handle at said bulbous member which engages a track on said forward member of said second handle.

14. The crab shell cutter of claim 13, said track capable of receiving said pivoting switch.

* * * * *